(12) United States Patent
Lu et al.

(10) Patent No.: US 11,102,401 B2
(45) Date of Patent: Aug. 24, 2021

(54) IMAGE DEVICE CORRESPONDING TO DEPTH INFORMATION/PANORAMIC IMAGE AND RELATED IMAGE SYSTEM THEREOF

(71) Applicant: eYs3D Microelectronics, Co., Taipei (TW)

(72) Inventors: Chao-Chun Lu, Taipei (TW); Ming-Hua Lin, Taipei (TW); Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/942,442

(22) Filed: Mar. 31, 2018

(65) Prior Publication Data

US 2018/0288324 A1 Oct. 4, 2018

Related U.S. Application Data

(60) Provisional application No. 62/479,332, filed on Mar. 31, 2017.

(51) Int. Cl.
*H04N 5/232* (2006.01)
*H04N 5/225* (2006.01)
(Continued)

(52) U.S. Cl.
CPC ....... *H04N 5/23238* (2013.01); *H04N 5/2258* (2013.01); *H04N 5/2252* (2013.01);
(Continued)

(58) Field of Classification Search
CPC .............. H04N 5/2256; H04N 5/2258; H04N 5/23238; H04N 5/247; H04N 5/2252;
(Continued)

(56) References Cited

U.S. PATENT DOCUMENTS 7,102,686 B1 * 9/2006 Orimoto ................ G03B 35/08
348/375
8,730,299 B1 * 5/2014 Kozko .................. H04N 5/2258
348/38
(Continued)

FOREIGN PATENT DOCUMENTS

CN 105890520 A 8/2016
CN 105940675 A 9/2016
(Continued)

*Primary Examiner* — Behrooz M Senfi
*Assistant Examiner* — Kathleen M Walsh
(74) *Attorney, Agent, or Firm* — Winston Hsu (57) ABSTRACT

An image device corresponding to depth information/panoramic image includes at least two image capturers. A first image capturer and a second image capturer of the at least two image capturers are used for capturing a plurality of first images and a plurality of second images, respectively. The first image capturer transmits the plurality of first images to an image processor, the second image capturer transmits the plurality of second images to the image processor, and the image processor generates depth information according to the plurality of first images, and generates panoramic images or panoramic videos according to the plurality of second images.

14 Claims, 7 Drawing Sheets

(51) Int. Cl.
*H04N 5/247* (2006.01)
*H04N 5/235* (2006.01)

(52) U.S. Cl.
CPC ......... *H04N 5/2256* (2013.01); *H04N 5/2352* (2013.01); *H04N 5/2354* (2013.01); *H04N 5/247* (2013.01)

(58) Field of Classification Search
CPC ............... H04N 5/2352; H04N 5/2354; H04N 21/21805; H04N 5/3415; H04N 13/00
USPC ............................................. 348/36, 42, 169
See application file for complete search history.

(56) References Cited

U.S. PATENT DOCUMENTS

| | | | | |
|---|---|---|---|---|
| 9,007,431 | B1* | 4/2015 | Kozko | H04N 5/2258 348/38 |
| 9,332,167 | B1* | 5/2016 | Pance | H04N 5/2258 |
| 9,699,379 | B1* | 7/2017 | Baldwin | H04N 5/23238 |
| 9,892,488 | B1* | 2/2018 | Brailovskiy | G06T 7/337 |
| 2001/0029167 | A1* | 10/2001 | Takeda | H04M 1/0254 455/41.1 |
| 2003/0203747 | A1* | 10/2003 | Nagamine | H04M 1/0243 455/575.3 |
| 2008/0117316 | A1* | 5/2008 | Orimoto | H04N 13/246 348/240.3 |
| 2010/0194860 | A1* | 8/2010 | Mentz | H04N 5/2252 348/47 |
| 2011/0117958 | A1* | 5/2011 | Kim | H04M 1/0264 455/556.1 |
| 2012/0268569 | A1* | 10/2012 | Kurokawa | H04N 13/239 348/47 |
| 2013/0278722 | A1* | 10/2013 | Chen | G02B 7/023 348/46 |
| 2014/0043436 | A1* | 2/2014 | Bell | G06T 19/20 348/46 |
| 2015/0049205 | A1* | 2/2015 | Okabe | H04N 5/2253 348/207.1 |
| 2015/0085184 | A1* | 3/2015 | Vidal | H04N 5/2252 348/376 |
| 2015/0103146 | A1* | 4/2015 | Rose | H04N 13/239 348/47 |
| 2015/0145952 | A1* | 5/2015 | Hirata | H04N 5/23206 348/38 |
| 2015/0162048 | A1* | 6/2015 | Hirata | G11B 20/10527 386/337 |
| 2017/0019595 | A1* | 1/2017 | Chen | G06T 3/0018 |
| 2017/0150112 | A1* | 5/2017 | Wu | H04N 5/2256 |
| 2017/0264830 | A1* | 9/2017 | Udodov | H04M 1/0264 |
| 2017/0293998 | A1* | 10/2017 | Kim | G06T 7/33 |
| 2018/0124230 | A1* | 5/2018 | Muthukumar | G06F 1/166 |
| 2018/0139431 | A1* | 5/2018 | Simek | H04N 13/254 |
| 2018/0152550 | A1* | 5/2018 | Dharmatilleke | H04N 5/23245 |

FOREIGN PATENT DOCUMENTS

| | | |
|---|---|---|
| JP | 2011130282 A * | 6/2011 |
| TW | I538512 B | 6/2016 |
| TW | M533238 U | 12/2016 |

\* cited by examiner

IMAGE DEVICE CORRESPONDING TO DEPTH INFORMATION/PANORAMIC IMAGE AND RELATED IMAGE SYSTEM THEREOF

CROSS REFERENCE TO RELATED APPLICATIONS

This application claims the benefit of U.S. Provisional Application No. 62/479,332, filed on Mar. 31, 2017 and entitled "Image Processing System," the contents of which are incorporated herein by reference.

BACKGROUND OF THE INVENTION

1. Field of the Invention

The present invention relates to an image device corresponding to depth information/panoramic image and a related image system thereof, and particularly to an image device and a related image system thereof that can simultaneously provide a plurality of first images for generating depth information and a plurality of second images for generating panoramic images or panoramic videos.

2. Description of the Prior Art

Nowadays, a requirement of a consumer for virtual reality (VR) (or augmented reality (AR), or mixed reality (MR)) is gradually increased, so applications corresponding to virtual reality (or augmented reality, or mixed reality) installed in a portable device are gradually popular. In addition, a requirement of the consumer for privacy thereof is also gradually increased, biometric (e.g. face recognition) is also gradually applied to the portable device to unlock the portable device. However, because virtual reality (VR) (or augmented reality (AR), or mixed reality (MR)) and face recognition are not standard applications of the portable device, how to simultaneously implement virtual reality (or augmented reality, or mixed reality) and biometric on the portable device becomes an important issue.

SUMMARY OF THE INVENTION

An embodiment of the present invention provides an image device corresponding to depth information/panoramic image. The image device includes at least two image capturers. A first image capturer and a second image capturer of the at least two image capturers capture a plurality of first images and a plurality of second images, respectively. The first image capturer transmits the plurality of first images to an image processor, the second image capturer transmits the plurality of second images to the image processor through the first image capturer, and the image processor generates depth information according to the plurality of first images and generates panoramic images or panoramic videos according to the plurality of second images.

Another embodiment of the present invention provides an image system generating depth information/panoramic image. The image system includes at least two image capturers and an image processor. A first image capturer and a second image capturer of the at least two image capturers capture a plurality of first images and a plurality of second images respectively, wherein the first image capturer and the second image capturer are detachable. The image processor is coupled to the first image capturer and the second image capturer, wherein the image processor generates depth information according to the plurality of first images and generates panoramic images or panoramic videos according to the plurality of second images, respectively.

Another embodiment of the present invention provides an image device corresponding to depth information/panoramic image. The image device includes at least one first image capturer and at least one light source. The at least one light source emits a random pattern or a structure light, wherein intense of the at least one light source is dynamically adjusted optionally, and the at least one first image capturer captures first images including the random pattern or the structure light.

The present invention provides an image device corresponding to depth information/panoramic image and a related image system thereof. The image device and the image system utilize a first image capturer and a second image capturer of at least two image capturers to capture a plurality of first images and a plurality of second images respectively, and utilize a transmission circuit included in the first image capturer to make the first image capturer and the second image capturer be coupled to a portable device. Then, an image processor of the portable device can generate depth information according to the plurality of first images and generate panoramic images or panoramic videos according to the plurality of second images, respectively. Therefore, the present invention not only can utilize the panoramic images (or the panoramic videos) to provide applications corresponding to virtual reality (VR), augmented reality (AR), or mixed reality (MR), but can also utilize the depth information to provide face recognition operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
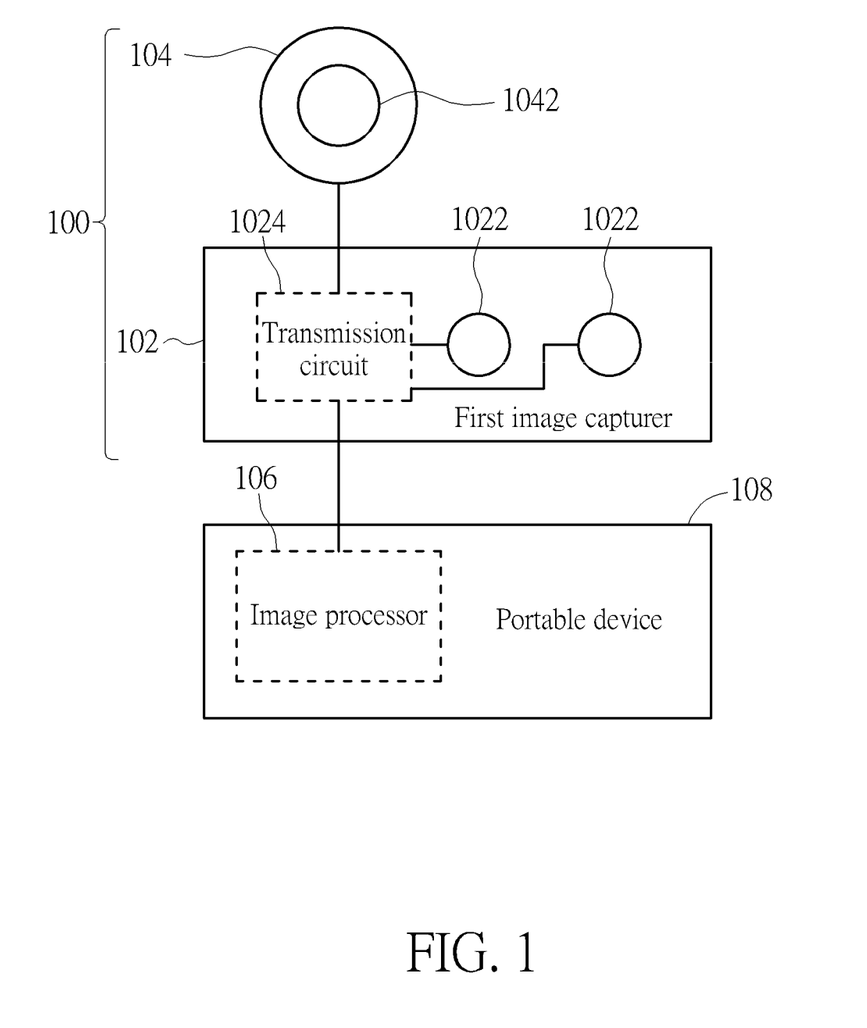
FIG. 1 is a diagram illustrating an image device corresponding to depth information/panoramic image according to a first embodiment of the present invention.

Please refer to FIG. 1. FIG. 1 is a diagram illustrating an image device 100 corresponding to depth information/panoramic image according to a first embodiment of the present invention. As shown in FIG. 1, the image device 100 includes a first image capturer 102 and a second image capturer 104, the first image capturer 102 includes two first lenses 1022, the second image capturer 104 includes two second lenses 1042, and the first image capturer 102 and the second image capturer 104 are separate from each other (that is, the first image capturer 102 and the second image capturer 104 have own shells, respectively), wherein because the two second lenses 1042 are back-to-back installed in the second image capturer 104, FIG. 1 only shows the second lens 1042 in front (that is, the second lens 1042 in rear is covered by the second lens 1042 in front). In addition, in an embodiment of the present invention, the first image capturer 102 and the second image capturer 104 are detachable. But, the present invention is not limited to the image device 100 including the first image capturer 102 and the second image capturer 104. That is to say, the image device 100 can include more than two image capturers. In addition, the present invention is also not limited to the first image capturer 102 including the two first lenses 1022 and the second image capturer 104 including the two second lenses 1042. That is to say, the first image capturer 102 can include more than two first lenses 1022, and the second image capturer 104 can also include more than two second lenses 1042. In addition, in an embodiment of the present invention, the first image capturer 102 and the second image capturer 104 are cameras.

As shown in FIG. 1, the first image capturer 102 is coupled to an image processor 106 directly through a transmission circuit 1024, the second image capturer 104 is coupled to the image processor 106 through the transmission circuit 1024, wherein the transmission circuit 1024 is included in the first image capturer 102, the transmission circuit 1024 is a hub (e.g. a universal serial bus (USB) hub) or a switcher, the image processor 106 is installed in a portable device 108, and the portable device 108 can be a smart phone, a tablet, or a notebook computer. In addition, in another embodiment of the present invention, the image processor 106 is included in a desktop computer. In addition, the transmission circuit 1024 utilizes a first transmission interface thereof (not shown in FIG. 1) to communicate with the image processor 106, utilizes a second transmission interface thereof (not shown in FIG. 1) to communicate with the second image capturer 104, and utilizes a third transmission interface thereof (not shown in FIG. 1) to communicate with the two first lenses 1022, wherein the first transmission interface, the second transmission interface, and the third transmission interface can be type-C USB interfaces, non-type-C USB interfaces (e.g. type-A USB interfaces, type-B USB interfaces, mini-A USB interfaces, mini-B USB interfaces, micro-A USB interfaces, or micro-B USB interfaces), lightning interfaces, or display port (DP) interfaces. In addition, in another embodiment of the present invention, the image device 100 includes the first image capturer 102, the second image capturer 104, and the image processor 106.

Figure 2:
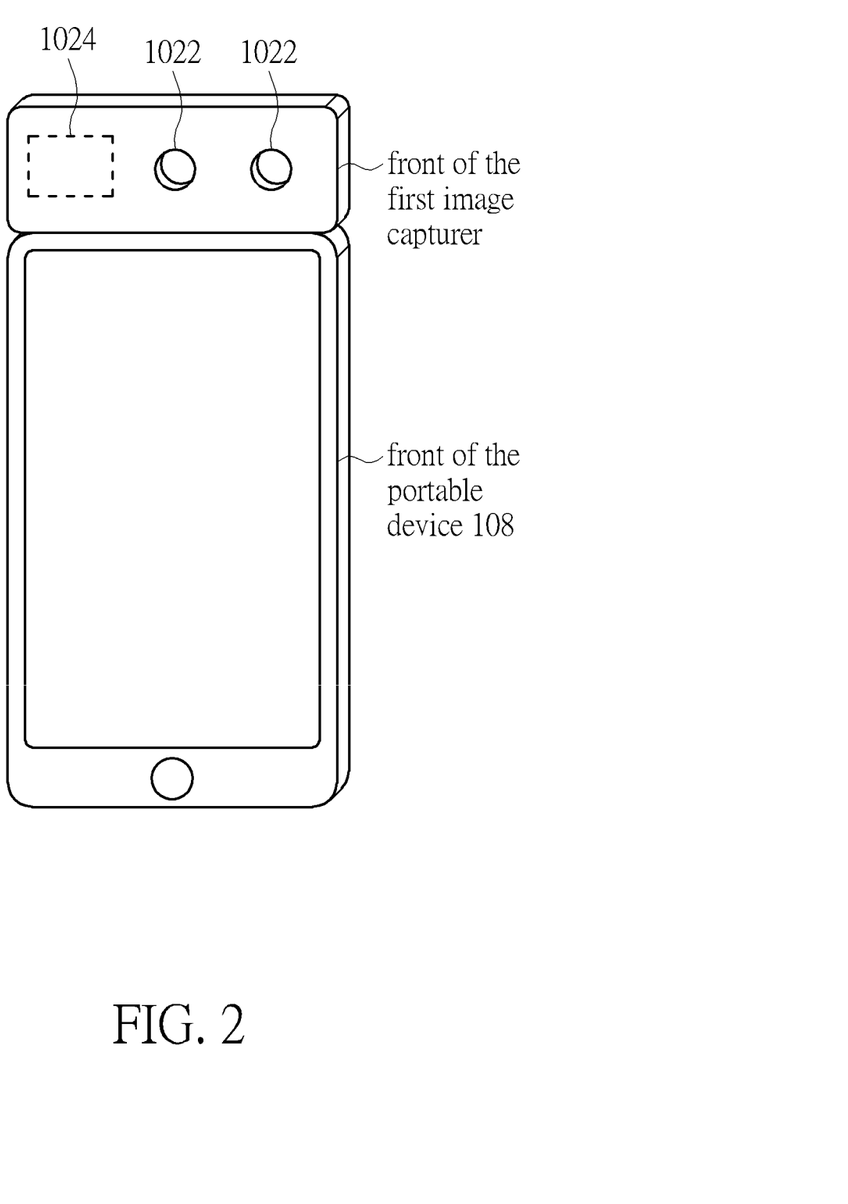
FIG. 2 is a diagram illustrating the first image capturer being coupled to the portable device when the first transmission interface is a non-type-C USB interface or a display port interface.

Please refer to FIG. 2. FIG. 2 is a diagram illustrating the first image capturer 102 being coupled to the portable device 108 when the first transmission interface is a non-type-C USB interface or a display port interface, wherein the first image capturer 102 is coupled to the portable device 108 through the transmission circuit 1024 and a charging connector (not shown in FIG. 2) of a shell of the portable device 108, and the charging connector is applied to a non-type-C USB interface or a display port interface. Because the first transmission interface is a non-type-C USB interface or a display port interface, when the first image capturer 102 is coupled to the portable device 108, the charging connector of the shell of the portable device 108 will limit a front of the first image capturer 102 and a front of the portable device 108 in the same direction. Therefore, the first image capturer 102 can utilize the two first lenses 1022 to capture a plurality of first images toward the front of the portable device 108. For example, the first image capturer 102 can utilize the two first lenses 1022 to capture the plurality of first images corresponding to a face of a user owning the portable device 108 toward the front of the portable device 108. After the first image capturer 102 utilizes the two first lenses 1022 to capture the plurality of first images corresponding to the face of the user, the first image capturer 102 can transmit the plurality of first images corresponding to the face of the user to the image processor 106 of the portable device 108 through the transmission circuit 1024, and the image processor 106 can generate depth information corresponding to the face of the user according to the plurality of first images corresponding to the face of the user. Therefore, the image processor 106 can utilize the depth information corresponding to the face of the user to execute a face recognition operation. For example, the image processor 106 can first utilize the depth information corresponding to the face of the user to execute the face recognition operation, and then unlock a screen of the portable device 108 through the face recognition operation.

In addition, in another embodiment of the present invention, the first image capturer 102 can further include at least one infrared ray light source for emitting a random pattern or a structure light, so the first image capturer 102 can utilize the two first lenses 1022 to capture the plurality of first images corresponding to the random pattern or the structure light, wherein the at least one infrared ray light source is turned on according to at least one of luminance of an environment which the image device 100 is located at, a quality of depth information corresponding to the plurality of first images (corresponding to the random pattern or the structure light), and a difference of the depth information corresponding to turning-on and turning-off of the at least one infrared ray light source. In addition, the present invention is not limited to the first image capturer 102 including at least one infrared ray light source, that is, the first image capturer 102 can include other type light sources. For example, the first image capturer 102 can include at least one visible light source. Or, in another embodiment of the present invention, the first image capturer 102 can also include at least one infrared ray laser light source.

When the at least one infrared ray light source is turned on according to the luminance of the environment which the image device 100 is located at, the first image capturer 102 (or the second image capturer 104, or an image capturer of the portable device 108) can determine the luminance of the environment which the image device 100 is located at according to at least one of its a shutter time, an exposure time, and an ISO (International Organization for Standardization) gain set currently. Taking the exposure time as an example, in an embodiment of the present invention, when the shutter time of the first image capturer 102 is fixed (or the first image capturer 102 has no shutter), the first image capturer 102 can determine whether to turn on the at least one infrared ray light source according to a value GEX generated by equation (1):

$$GEX = gain*EXPT \quad (1)$$

As shown in equation (1), "gain" shown in equation (1) is the ISO gain of the first image capturer 102 and "EXPT" shown in equation (1) is the exposure time of the first image capturer 102. When the value GEX is greater than a high threshold value, it means that the luminance of the environment which the image device 100 is located at is too dark, so the first image capturer 102 turns on the at least one infrared ray light source; and when the value GEX is less than a low threshold value, it means that the luminance of the environment which the image device 100 is located at is bright enough, so the first image capturer 102 turns off the at least one infrared ray light source, wherein the high threshold value is greater than the low threshold value. In addition, when a maximum value of the value GEX (corresponding to a maximum exposure time and a maximum gain of the first image capturer 102) fails to be greater than the high threshold value, the first image capturer 102 can turn on the at least one infrared ray light source according to current luminance of the environment which the image device 100 is located at.

When the at least one infrared ray light source is turned on according to the quality of the depth information corresponding to the plurality of first images, the first image capturer 102 can determine the quality of the depth information corresponding to the plurality of first images according to at least one of invalid areas of the depth information corresponding to the plurality of first images and smoothness of the depth information corresponding to the plurality of first images. For example, in an embodiment of the present invention, the first image capturer 102 can determine whether to turn on the at least one infrared ray light source according to a value COST generated by equation (2):

$$COST = a*mean(HPF(x)) + b*invalid\_cnt(x) \quad (2)$$

As shown in equation (2), "HPF(x)" shown in equation (2) corresponds to a response of a high pass filter (the smoothness of the depth information of the plurality of first images corresponds to high frequency areas of the depth information of the plurality of first images), "mean(HPF(x))" shown in equation (2) corresponds to an average of the response of the high pass filter (but, in another embodiment of the present invention, "mean(HPF(x))" shown in equation (2) can be replaced with a sum corresponding to the response of the high pass filter), "invalid_cnt(x)" shown in equation (2) represents a number of pixels of the invalid areas, "x" shown in equation (2) represents the depth information corresponding to the plurality of first images, and "a, b" shown in equation (2) are coefficients. When the value COST is greater than a threshold value, it means that the luminance of the environment which the image device 100 is located at is too dark or shot objects of the plurality of first images have no texture, so the first image capturer 102 turns on the at least one infrared ray light source. In addition, after the at least one infrared ray light source is turned on for a predetermined time, the first image capturer 102 can attempt to turn off the at least one infrared ray light source and capture at least one image, and the first image capturer 102 calculates a cost value corresponding to the at least one image according to equation (2). If the cost value corresponding to the at least one image is still greater than the threshold value, the first image capturer 102 turns on the at least one infrared ray light source again and executes the above mentioned operation again after the first image capturer 102 turns on the at least one infrared ray light source for the predetermined time; and if the cost value corresponding to the at least one image is less than the threshold value, the first image capturer 102 turns off the at least one infrared ray light source until the cost value corresponding to the at least one image is greater than the threshold value again.

In addition, the first image capturer 102 can turn on and turn off the at least one infrared ray light source, and determine the quality of the depth information according to the difference of the depth information corresponding to turning-on and turning-off of the at least one infrared ray light source. If the difference of the depth information corresponding to turning-on and turning-off of the at least one infrared ray light source is less than a reference value, it means that turning-on and turning-off of the at least one infrared ray light source does not influence the quality of the depth information, so the first image capturer 102 can turn off the at least one infrared ray light source.

In addition, after the at least one infrared ray light source is turned on, the first image capturer 102 can optionally adjust intense of the at least one infrared ray light source according to luminance corresponding to the plurality of first images and a target value, wherein the target value is set according to reflection coefficient of a human skin of the user corresponding to emitting light of the at least one infrared ray light source. For example, the first image capturer 102 can generate a luminance distribution map corresponding to the plurality of first images according to the plurality of first images, and optionally adjust the intense of the at least one infrared ray light source according to a percentage of the depth information occupied by an area corresponding to a maximum luminance value of at least one luminance value within the luminance distribution map greater than the target value. In addition, in another embodiment of the present invention, the first image capturer 102 can generate average luminance corresponding to the plurality of first images according to the plurality of first images, and optionally adjust the intense of the at least one infrared ray light source according to the average luminance and the target value. In addition, in another embodiment of the present invention, the first image capturer 102 can generate a luminance histogram corresponding to a plurality of pixels of the plurality of first images according to the plurality of first images, and optionally adjust the intense of the at least one infrared ray light source according to a median of the luminance histogram and the target value, or a quartile of the luminance histogram and the target value.

In addition, in another embodiment of the present invention, after the at least one infrared ray light source is turned on, the first image capturer 102 can optionally dynamically adjust the intense of the at least one infrared ray light source according to a distance between at least one predetermined object within the plurality of first images and the first image capturer 102 and a first lookup table, wherein the first lookup table stores relationships between a distance corresponding to an object and the intense of the at least one infrared ray light source. In addition, in another embodiment of the present invention, the first image capturer 102 can optionally dynamically adjust the intense of the at least one infrared ray light source according to the distance between the at least one predetermined object within the plurality of first images and the first image capturer 102 and a first correlation formula.

In addition, in another embodiment of the present invention, the first image capturer 102 continuously detects the luminance of the environment which the image device 100 is located at under the at least one infrared ray light source being turned off. When the luminance of the environment is brighter, the first image capturer 102 increases the intense of the at least one infrared ray light source (when the at least one infrared ray light source is turned on) according to a second lookup table, wherein the second lookup table stores relationships between the intense of the at least one infrared ray light source (when the at least one infrared ray light source is turned on) and the luminance of the environment. In addition, in another embodiment of the present invention, when the luminance of the environment is brighter, the first image capturer 102 increases the intense of the at least one infrared ray light source (when the at least one infrared ray light source is turned on) according to a second correlation formula.

In addition, in another embodiment of the present invention, the first image capturer 102 first turns off at least one infrared ray light source, and then detects the luminance of the environment. Then, according to an automatic exposure (AE) algorithm well-known to one of ordinary skill in the art, the first image capturer 102 utilizes its own exposure time (or at least one of shutter time, exposure time, and ISO gain) to make the luminance of the environment be reduced to not to interfere with the first image capturer 102, and fixes the current exposure time of the first image capturer 102. Then, the first image capturer 102 turns on the at least one infrared ray light source and detects the intense of the at least one infrared ray light source to the target value.

In addition, the portable device 108 can drive the first image capturer 102 through the charging connector and the transmission circuit 1024. That is, the portable device 108 can transmit power to derive the first image capturer 102 through the charging connector and the transmission circuit 1024. But, in another embodiment of the present invention, the first image capturer 102 can be driven by an external power supply (not the portable device 108), wherein the external power supply can be a wired external power supply or a wireless external power supply.

In addition, when the first transmission interface is a non-type-C USB interface or a display port interface, and the front of the portable device 108 is back to the user, the first image capturer 102 can utilize the two first lenses 1022 to capture a plurality of first images corresponding to an environment which the user faces toward the front of the portable device 108. Then, the first image capturer 102 can transmit the plurality of first images corresponding to the environment which the user faces to the image processor 106 through the transmission circuit 1024, and the image processor 106 can generate depth information corresponding to the environment which the user faces according to the plurality of first images corresponding to the environment which the user faces.

Figure 3:
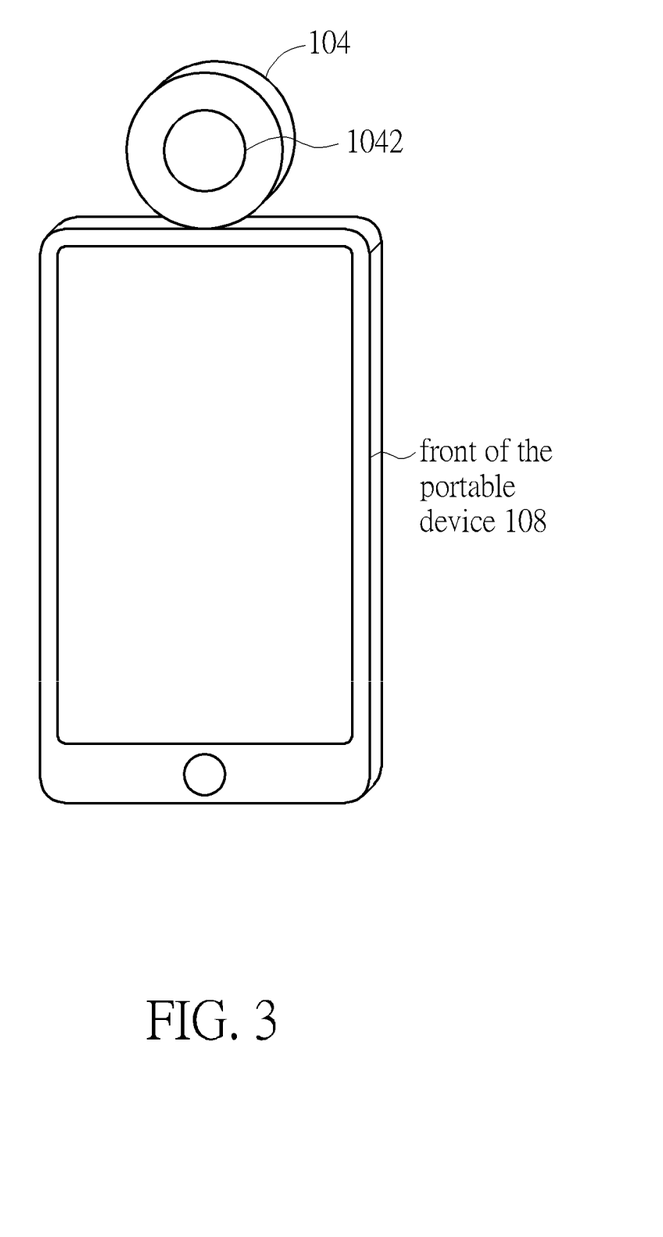
FIG. 3 is a diagram illustrating the second image capturer being coupled to the portable device when the charging connector of the portable device is applied to a non-type-C USB interface or a display port interface.

In addition, please refer to FIG. 3. FIG. 3 is a diagram illustrating the second image capturer 104 being coupled to the portable device 108 when the charging connector of the portable device 108 is applied to a non-type-C USB interface or a display port interface, wherein the second image capturer 104 is coupled to the portable device 108 through the charging connector (not shown in FIG. 3) of the shell of the portable device 108. Although the charging connector of the portable device 108 is applied to a non-type-C USB interface or a display port interface, because the two second lenses 1042 are back-to-back installed in the second image capturer 104, the second image capturer 104 can utilize the two second lenses 1042 to capture a plurality of second images toward the front of the portable device 108 and a rear of the portable device 108 (wherein the rear of the portable device 108 corresponding to a back of the portable device 108), respectively. For example, the second image capturer 104 can utilize the two second lenses 1042 to capture the plurality of second images corresponding to an environment which the portable device 108 is located at toward the front and the rear of the portable device 108, respectively. In addition, in another embodiment of the present invention, the second image capturer 104 can also utilize the two second lenses 1042 to capture the plurality of second images toward other direction of the portable device 108. In other words, according to a design requirement, the present invention can make the two second lenses 1042 of the second image capturer 104 capture the plurality of second images toward any direction, rather than making the two second lenses 1042 be limited to a specific direction. After the second image capturer 104 utilizes the two second lenses 1042 to capture the plurality of second images corresponding to the environment which the portable device 108 is located at, the second image capturer 104 can transmit the plurality of second images corresponding to the environment which the portable device 108 is located at to the image processor 106 of the portable device 108 through the charging connector of the shell of the portable device 108, and the image processor 106 can generate 360° panoramic images or 360° panoramic videos according to the plurality of second images corresponding to the environment which the portable device 108 is located at, wherein the 360° panoramic images and the 360° panoramic videos include color information corresponding to the environment which the portable device 108 is located at. In addition, in another embodiment of the present invention, the image processor 106 of the portable device 108 utilizes the plurality of second images corresponding to the environment which the portable device 108 is located at captured by the second image capturer 104 to execute object motion detection. In addition, when the image processor 106 executes the object motion detection, the image processor 106 can continuously utilize (or can stop utilizing) the plurality of second images corresponding to the environment which the portable device 108 is located at captured by the second image capturer 104 to generate the 360° panoramic images or the 360° panoramic videos corresponding to the environment which the portable device 108 is located at. In addition, the portable device 108 can drive the second image capturer 104 through the charging connector. That is, the portable device 108 can transmit power to drive the second image capturer 104 through the charging connector. But, in another embodiment of the present invention, the second image capturer 104 can be driven by the external power supply (not the portable device 108). In addition, in another embodiment of the present invention, the image processor 106 of the portable device 108 can utilize a plurality of third images corresponding to the environment which the portable device 108 is located at captured by an image capturer (not shown in FIG. 3) built in the portable device 108 to execute the object motion detection.

In addition, in another embodiment of the present invention, when the second image capturer 104 is coupled to the portable device 108, and the charging connector of the portable device 108 is applied to a type-C USB interface or a lightning interface, a coupling relationship between the second image capturer 104 and the portable device 108 can be referred to FIG. 3, so further description thereof is omitted for simplicity. In addition, when the second image capturer 104 is coupled to the portable device 108, and the charging connector of the portable device 108 is applied to a type-C USB interface or a lightning interface, operational principles of the second image capturer 104 and the portable device 108 can be referred to corresponding descriptions of FIG. 3, so further description thereof is also omitted for simplicity.

Figure 4:
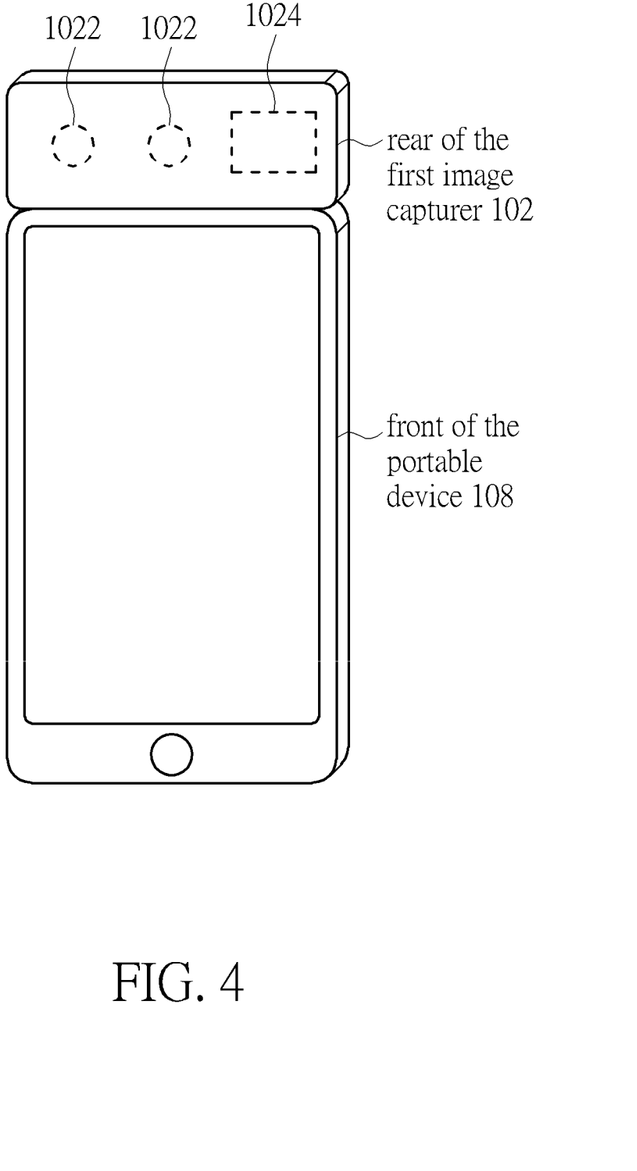
FIG. 4 is a diagram illustrating the first image capturer being coupled to the portable device when the first transmission interface is a type-C USB interface or a lightning interface.

Please refer to FIG. 4. FIG. 4 is a diagram illustrating the first image capturer 102 being coupled to the portable device 108 when the first transmission interface is a type-C USB interface or a lightning interface, wherein the first image capturer 102 is coupled to the portable device 108 through the transmission circuit 1024 and the charging connector (not shown in FIG. 4) of the shell of the portable device 108, and the charging connector is applied to a type-C USB interface or a lightning interface. Because the first transmission interface is a type-C USB interface or a lightning interface, when the first image capturer 102 is coupled to the portable device 108, the front of the first image capturer 102 and the front of the portable device 108 can be toward different directions or the same direction (that is, meanwhile the charging connector of the shell of the portable device 108 does not limit the front of the first image capturer 102 and the front of the portable device 108 toward the same direction). For example, as shown in FIG. 4, a rear of the first image capturer 102 and the front of the portable device 108 are toward the same direction. Therefore, as shown in FIG. 4, the first image capturer 102 can utilize the two first lenses 1022 to capture a plurality of first images corresponding to the environment which the user faces toward the rear of the portable device 108 (corresponding to the back of the portable device 108). After the first image capturer 102 transmits the plurality of first images corresponding to the environment which the user faces to the image processor 106 of the portable device 108 through the transmission circuit 1024, the image processor 106 can generate depth information corresponding to the environment which the user faces according to the plurality of first images corresponding to the environment which the user faces. Therefore, for example, the image processor 106 can utilize the depth information corresponding to the environment (including at least one face, wherein the at least one face is different from the face of the user) which the user faces to execute the face recognition operation. But, in another embodiment of the present invention, the image processor 106 utilizes the depth information corresponding to the environment which the user faces to generate a three-dimensional image corresponding to the environment which the user faces.

Figure 5:
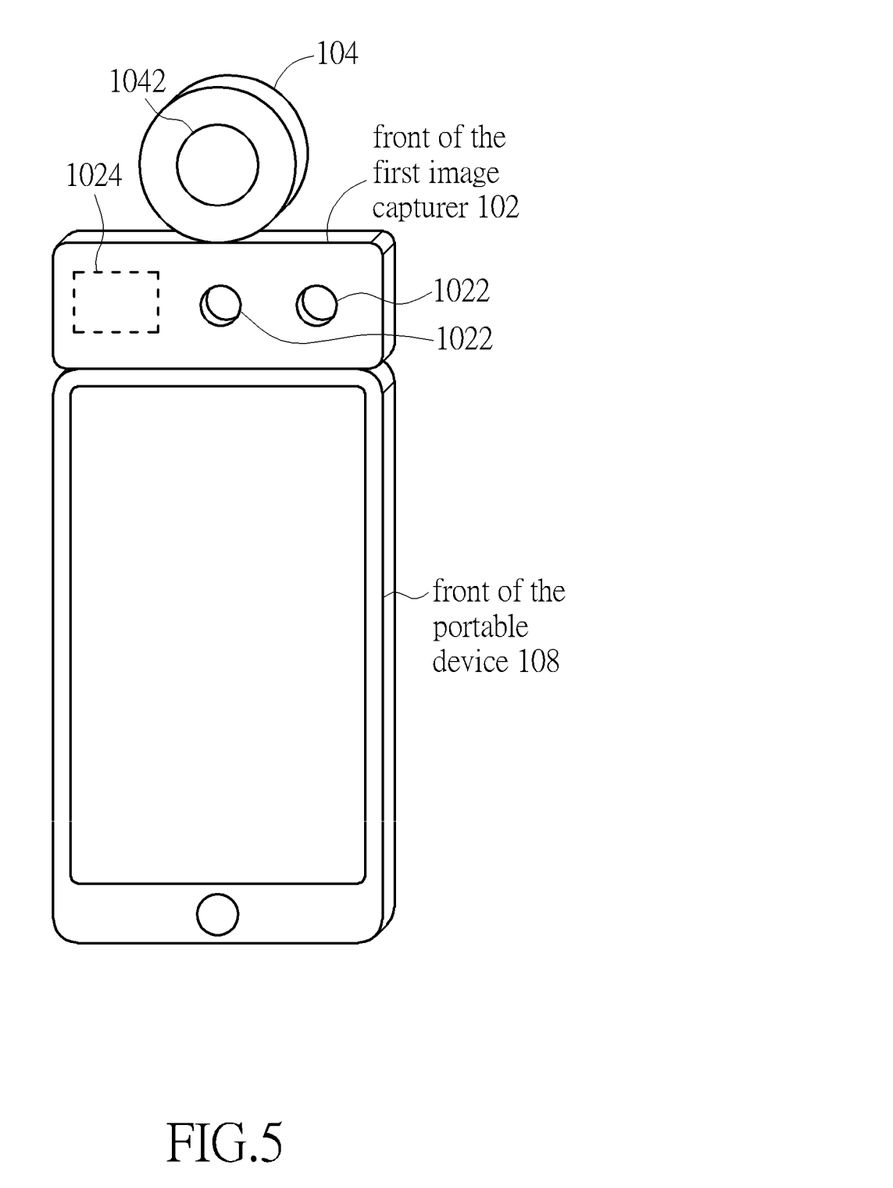
FIG. 5 is a diagram illustrating the first image capturer being coupled to the portable device and the second image capturer being coupled to the portable device through the first image capturer when the first transmission interface is a non-type-C USB interface or a display port interface.

Please refer to FIG. 5. FIG. 5 is a diagram illustrating the first image capturer 102 being coupled to the portable device 108 and the second image capturer 104 being coupled to the portable device 108 through the first image capturer 102 (the transmission circuit 1024) when the first transmission interface is a non-type-C USB interface or a display port interface. As shown in FIG. 5, an operational principle of the first image capturer 102 can be referred to corresponding descriptions of FIG. 2, so further description thereof is omitted for simplicity. In addition, the operational principle of the second image capturer 104 can be referred to corresponding descriptions of FIG. 3, so further description thereof is also omitted for simplicity. In addition, coupling relationships between the first image capturer 102, the second image capturer 104, and the portable device 108 shown in FIG. 5 can be referred to FIG. 1, so further description thereof is also omitted for simplicity. Therefore, as shown in FIG. 5, the first image capturer 102 and the portable device 108 can execute the face recognition operation corresponding to the user or generate the depth information corresponding to the environment which the user faces, and the second image capturer 104 and the portable device 108 can generate the 360° panoramic images or the 360° panoramic videos corresponding to the environment which the portable device 108 is located at. In addition, in another embodiment of the present invention, the image processor 106 is included in the image device 100, and the first image capturer 102, the second image capturer 104, and the image processor 106 are separate hardware. Therefore, the first image capturer 102 and the image processor 106 can execute the face recognition operation corresponding to the user or generate the depth information corresponding to the environment which the user faces, and the second image capturer 104 and the image processor 106 can generate the 360° panoramic images or the 360° panoramic videos corresponding to the environment which the portable device 108 is located at. In addition, in another embodiment of the present invention, the image processor 106 is included in the first image capturer 102, wherein the operational principles of the first image capturer 102, the second image capturer 104, and the image processor 106 can be referred to the above mentioned descriptions, so further description thereof is omitted for simplicity.

In addition, in another embodiment of the present invention, as shown in FIG. 5, the image processor 106 utilizes the plurality of second images corresponding to the environment which the portable device 108 is located at captured by the second image capturer 104 to execute the object motion detection. In addition, as shown in FIG. 5, the transmission circuit 1024 transmits the plurality of first images captured by the first image capturer 102 and the plurality of second images captured by the second image capturer 104 to the image processor 106 through a time-division method. In addition, as shown in FIG. 5, the portable device 108 can utilize the time-division method to drive the first image capturer 102 and the second image capturer 104 through the charging connector and the transmission circuit 1024. But, in another embodiment of the present invention, the first image capturer 102 and the second image capturer 104 can be driven by the external power supply. In addition, in another embodiment of the present invention, the first image capturer 102 is driven by the external power supply, and the external power supply drives the second image capturer 104 further through the first image capturer 102 (the transmission circuit 1024).

Figure 6:
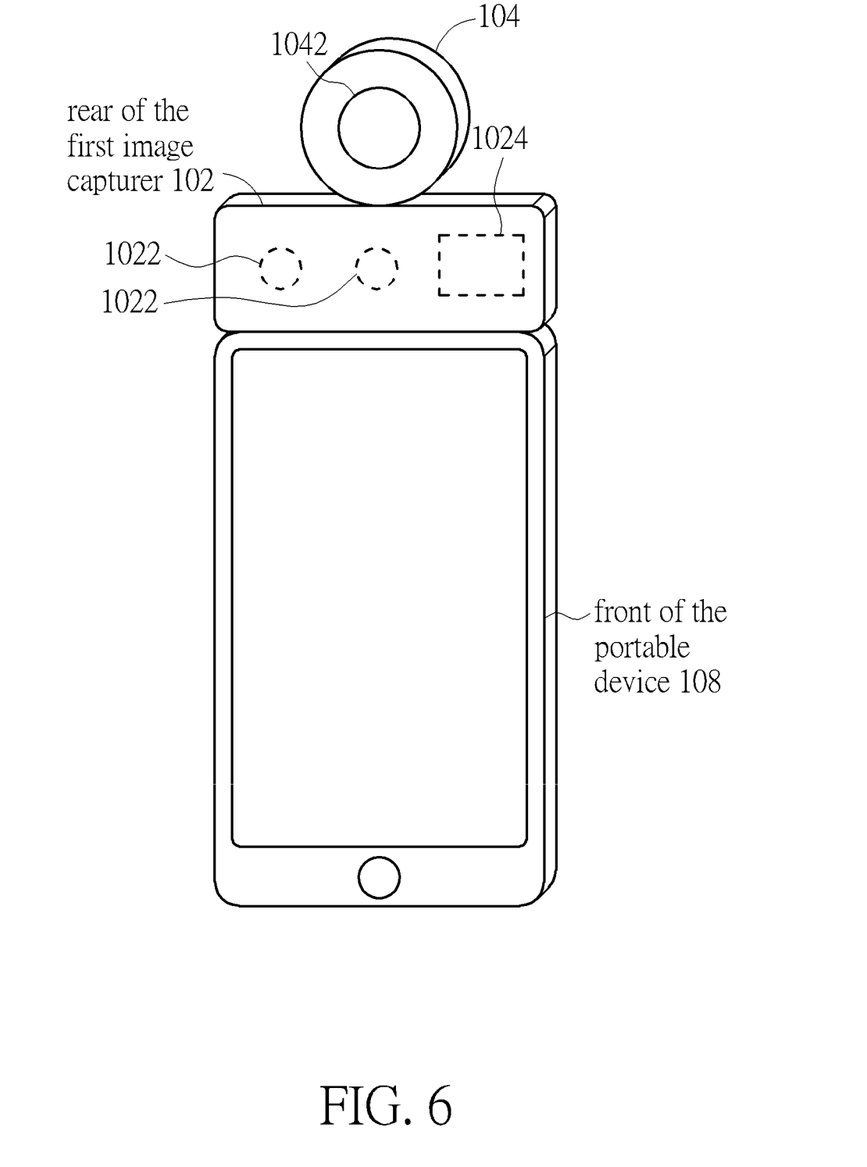
FIG. 6 is a diagram illustrating the first image capturer being coupled to the portable device and the second image capturer being coupled to the portable device through the first image capturer when the first transmission interface is a type-C USB interface or a lightning interface.

Please refer to FIG. 6. FIG. 6 is a diagram illustrating the first image capturer 102 being coupled to the portable device 108 and the second image capturer 104 being coupled to the portable device 108 through the first image capturer 102 when the first transmission interface is a type-C USB interface or a lightning interface, wherein the operational principle of the first image capturer 102 can be referred to the corresponding descriptions of FIG. 2, so further description thereof is omitted for simplicity. In addition, the operational principle of the second image capturer 104 can be referred to the corresponding descriptions of FIG. 3, so further description thereof is also omitted for simplicity. In addition, coupling relationships between the first image capturer 102, the second image capturer 104, and the portable device 108 shown in FIG. 6 can be referred to FIG. 1, so further description thereof is also omitted for simplicity. Therefore, as shown in FIG. 6, the first image capturer 102 and the portable device 108 can generate the depth information corresponding to the environment which the user faces, and the second image capturer 104 and the portable device 108 can generate the 360° panoramic images or the 360° panoramic videos corresponding to the environment which the portable device 108 is located at. In addition, in another embodiment of the present invention, as shown in FIG. 6, the image processor 106 utilizes the plurality of second images corresponding to the environment which the portable device 108 is located at captured by the second image capturer 104 to execute the object motion detection. In addition, when the first transmission interface is a type-C USB interface or a lightning interface, the first transmission interface can provide at least two channels to the first image capturer 102 and the second image capturer 104 to make the first image capturer 102 and the second image capturer 104 communicate with the portable device 108. For example, in an embodiment of the present invention, the first transmission interface provides a first channel (e.g. TX1/RX1) of the at least two channels to the first image capturer 102 to make the first image capturer 102 communicate with the portable device 108, and provides a second channel (e.g. TX2/RX2) of the at least two channels to the second image capturer 104 to make the second image capturer 104 communicate with the portable device 108. In addition, in another embodiment of the present invention, the first transmission interface simultaneously provides the first channel and the second channel and utilizes the time-division method to make the first image capturer 102 and the second image capturer 104 choose one of the first channel and the second channel to communicate with the portable device 108.

Figure 7:
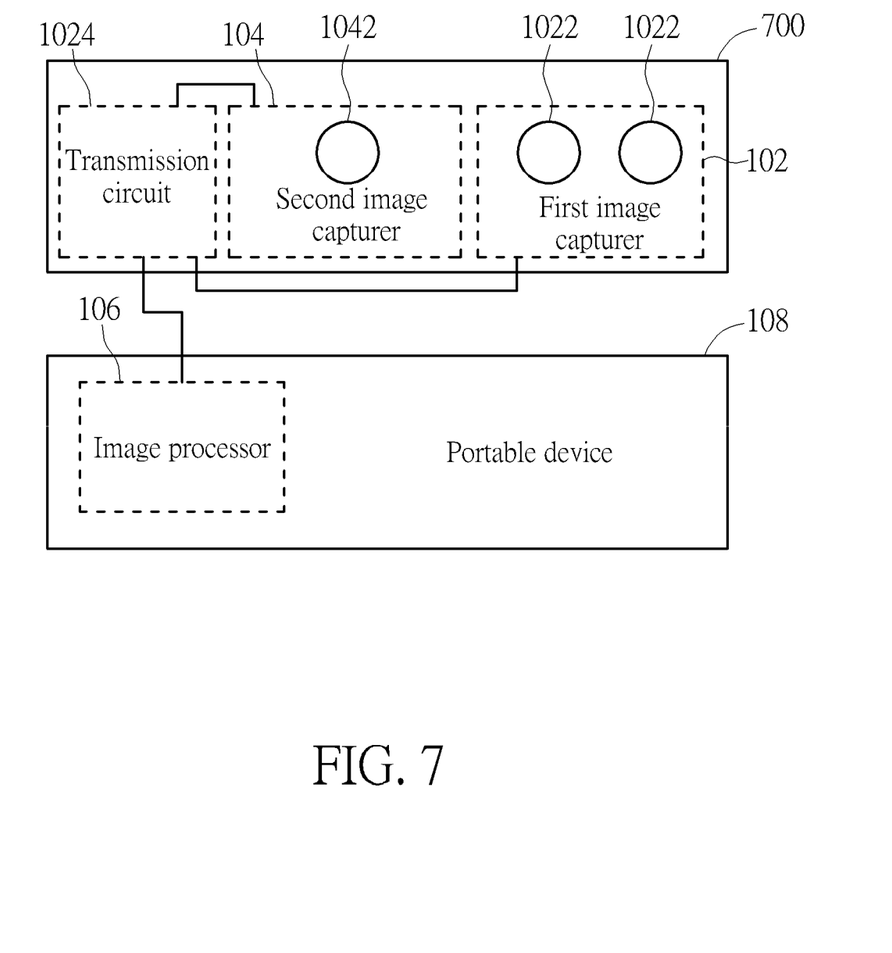
FIG. 7 is a diagram illustrating an image device corresponding to depth information/panoramic image according to a second embodiment of the present invention.

Please refer to FIG. 7. FIG. 7 is a diagram illustrating an image device 700 corresponding to depth information/panoramic image according to a second embodiment of the present invention. As shown in FIG. 7, the image device 700 includes the first image capturer 102 and the second image capturer 104, the first image capturer 102 includes the two first lenses 1022 and the second image capturer 104 includes the two second lenses 1042, and the first image capturer 102, the second image capturer 104, and the transmission circuit 1024 can be installed on a printed circuit board and in a shell, wherein because the two second lenses 1042 are back-to-back installed in the second image capturer 104, FIG. 7 only shows the second lens 1042 in front (that is, the second lens 1042 in rear is covered by the second lens 1042 in front). In addition, in another embodiment of the present invention, the image device 700 can include more than two image capturers. In addition, in another embodiment of the present invention, the image device 700 includes the first image capturer 102, the second image capturer 104, and the image processor 106. In addition, the operational principle of the first image capturer 102 of the image device 700 can be referred to the corresponding descriptions of FIG. 2, so further description thereof is omitted for simplicity. In addition, the operational principle of the second image capturer 104 of the image device 700 can be referred to corresponding descriptions of FIG. 3, so further description thereof is also omitted for simplicity. In addition, coupling relationships between the first image capturer 102, the second image capturer 104, and the portable device 108 shown in FIG. 7 can be referred to FIG. 1, so further description thereof is also omitted for simplicity.

To sum up, the image device and the related image system thereof utilize the first image capturer and the second image capturer to capture the plurality of first images and the plurality of second images respectively, and utilize the transmission circuit to make the first image capturer and the second image capturer be coupled to the portable device. Then, the image processor can generate the depth information according to the plurality of first images and generate the panoramic images or the panoramic videos according to the plurality of second images, respectively. Therefore, the present invention not only can utilize the panoramic images (or the panoramic videos) to provide applications corresponding to virtual reality (VR), augmented reality (AR), or mixed reality (MR), but can also utilize the depth information to provide the face recognition operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device corresponding to depth information/panoramic image, comprising:
   at least two image capturers, comprising:
      a first image capturer independently capturing a plurality of first images, wherein the first image capturer comprises a transmission circuit; and
      a second image capturer independently capturing a plurality of second images, wherein when the first image capturer is coupled to an image processor and the second image capturer is coupled to the image processor through the transmission circuit of the first image capturer, a case of the second image capturer is plugged in a case of the first image capturer through a transmission interface of the second image capturer to make the case of the first image capturer vertically hold the case of the second image capturer and the case of the second image capturer be stacked on a top of the case of the first image capturer vertically, and the case of the first image capturer and the case of the second image capturer are vertically spaced apart from each other;
   wherein the first image capturer transmits the plurality of first images to the image processor, the second image capturer transmits the plurality of second images to the image processor through the transmission circuit of the first image capturer, and the image processor generates depth information and panoramic images according to the plurality of first images and the plurality of second images.

2. The image device of claim 1, wherein the image processor generates the depth information according to the plurality of first images, and generates the panoramic images according to the plurality of second images.

3. The image device of claim 1, wherein the first image capturer comprises at least two first lenses and the second image capturer comprises at least two second lenses, and the first image capturer and the second image capturer are separate from each other.

4. The image device of claim 3, wherein the first image capturer transmits the plurality of first images to the image processor directly through the transmission circuit, the second image capturer transmits the plurality of second images to the image processor through the transmission circuit, wherein the transmission circuit is comprised in the first image capturer.

5. The image device of claim 4, wherein the transmission circuit is a hub or a switcher.

6. The image device of claim 4, wherein the transmission circuit comprises at least one non-type-C universal serial bus interface, at least one type-C universal serial bus interface, a lightning interface, or a display port interface.

7. The image device of claim 1, wherein when the image processor further utilizes the plurality of second images to perform motion detection, the image processor stops generating the panoramic images or the panoramic videos.

8. The image device of claim 1, wherein the image processor is installed in a portable device.

9. The image device of claim 8, wherein the image processor utilizes a plurality of third images captured by an image capturer built in the portable device to perform motion detection.

10. An image system generating depth information/panoramic image, comprising:
- at least two image capturers, comprising:
  - a first image capturer independently capturing a plurality of first images; and
  - a second image capturer independently capturing a plurality of second images; and
- an image processor coupled to the first image capturer and the second image capturer, wherein the image processor generates depth information and panoramic images according to the plurality of first images and the plurality of second images;
- wherein when the first image capturer is coupled to the image processor and the second image capturer is coupled to the image processor through the first image capturer, a case of the second image capturer is plugged in a case of the first image capturer through a transmission interface of the second image capturer to make the case of the first image capturer vertically hold the case of the second image capturer and the case of the second image capturer be stacked on a top of the case of the first image capturer vertically.

11. The image system of claim 10, wherein the first image capturer comprises at least two first lenses and the second image capturer comprises at least two second lenses, and the first image capturer and the second image capturer are installed on a printed circuit board and in a same shell.

12. The image system of claim 10, wherein the first image capturer comprises at least two first lenses and the second image capturer comprises at least two second lenses, and the first image capturer and the second image capturer are separate from each other.

13. The image system of claim 10, wherein the image processor is installed in a portable device.

14. The image system of claim 10, wherein the image processor generates the depth information according to the plurality of first images, and generates the panoramic images according to the plurality of second images.

* * * * *